Nov. 11, 1941.  H. G. ROBINSON  2,262,049
ABRASIVE CUTOFF MACHINE
Original Filed Oct. 24, 1936  6 Sheets-Sheet 1

Fig. 1

INVENTOR.
HARRY G. ROBINSON
BY
Frederick S. Duncan ATTORNEY

Nov. 11, 1941.     H. G. ROBINSON     2,262,049
ABRASIVE CUTOFF MACHINE
Original Filed Oct. 24, 1936     6 Sheets-Sheet 2

INVENTOR.
HARRY G. ROBINSON.
BY
ATTORNEY

Fig 4

Patented Nov. 11, 1941

2,262,049

UNITED STATES PATENT OFFICE 2,262,049

ABRASIVE CUTOFF MACHINE

Harry G. Robinson, Stratford, Conn., assignor to American Chain & Cable Company, Inc., New York, N. Y., a corporation of New York Continuation of application Serial No. 107,347, October 24, 1936. This application January 8, 1938, Serial No. 183,927

11 Claims. (Cl. 51—33)

This invention relates to new and useful improvements in method and means of cutting and the present application is a continuation of my application Serial Number 107,347, filed October 24, 1936.

An object of the invention is to provide an improved method and means whereby with a minimum expenditure of power a smooth clean cut may be obtained.

Other objects and advantages will become apparent as the description proceeds. However it is to be understood that the invention is not limited to the details described herein and shown in the accompanying drawings but includes all such variations and modifications as fall within the spirit of the invention and the scope of the appended claims.

Referring in detail to the drawings, the improved machine includes a generally rectangular hollow support 10 formed with a suitable base portion 11 and about its upper edge having a vertically extending flange 12. Mounted on the upper side of the support is a housing 13 within which the various cutting operations take place.

Carried by the support 10 is a shaft 14 on which is mounted one end of a support or carrier 15. Support or carrier 15 is somewhat L-shaped and extends upwardly at the rear side of the machine and at its upper end carries a shaft 16 on which is mounted an intermediate portion of an arm 17 which latter includes a portion 18 extending forwardly at one side of the housing 13 and also includes portions 19 and 20 extending downwardly and outwardly from the side of shaft 16 opposite that from which portion 18 extends.

In its side wall 21 (see Fig. 4), housing 13 is provided with an arcuate slot 22 through which extends a shaft 23 mounted in a bearing 24 (see Fig. 1) carried by the forward end of arm portion 18. Secured to said shaft within the housing 13 is the cut-off disc 25. It will be apparent that owing to the pivotal mounting 16, the arm 17 may be rocked so as to raise and lower the shaft 23 and thus raise and lower the cut-off disc. Mounted to be shifted with the shaft 23 is a cover or closure plate 26 for the slot 22, the arrangement being such that all portions of the slot above the shaft, in any position of the latter, are always covered by the plate.

The rear lower end portions of the arm portions 19 and 20 are connected by or carry a shaft 27 on which is mounted a plate 28 having an electric motor 29 secured thereto. Plate 28 includes an extension 28a carrying a head-like portion 30 having a slot 31 therein. Such head 30 is located adjacent to an extension 32 of arm 17 and a bolt 33 carried by said extension projects through the slot 31 and is adapted to be tightened to secure the plate 28 and thus the motor 29 in fixed position relative to said arm 17.

Motor 29 includes a shaft 34 carrying pulleys 35 over which are trained belts, not shown, also trained over pulleys 37 on the cut-off disc shaft 23. With this arrangement it will be obvious that as the motor operates it will serve to rotate the cut-off disc. Disposed over pulleys 35 and 37 and enclosing the belts is a suitable guard housing 38 supported as by straps 38a.

On loosening of bolts 33 the plate 28 may be adjusted about the shaft 27 so as to tighten belts and thereafter the bolt is tightened to hold the plate in its adjusted position. Such adjustment of plate 28 is relative to the arm 17 and the support 15, but it will be clear that being mounted by the portions 19 and 20 of the arm and the latter being mounted on the support 15, any movement of the arm and support will result in movement of the plate 28 and motor 29.

To maintain its driving connection with the shaft 23 and thus with the cut-off disc, the motor 29 is at all times moved with the arm 17. Such arm is adapted to be rocked about the shaft 16 so as to cause swinging movement of the cut-off disc toward and from a piece of work. Within the lower portion of the housing 13, there is a work-holding means including a V-block 39 and suitable clamps associated with said block and later to be described.

According to the present invention, hydraulic means are provided for rocking the arm 17 in the desired direction at the proper times to carry the cut-off disc to and from work being held in the block 39. This hydraulic means includes a cylinder 40, the inner or lower end of which is pivotally mounted as at 41 on an extension 42 of the oscillatable support 15. Within cylinder 40 is a piston (not shown) and extending through the upper end of the cylinder is a piston rod 43 attached to said piston and adapted to be projected and retracted as fluid under pressure is admitted to one end or the other of the cylinder.

The outer end of the piston rod 43 is pivotally attached as at 44 to an extension 45 of the arm portion 19. With this arrangement, as fluid under pressure is admitted to the outer end of cylinder 40, the rod 43 is drawn into the cylinder rocking portions 19 and 20 of arm 17 downwardly and rocking portion 18 of said arm upwardly so that the cut-off disc will be carried away from the work.

Thereafter on fluid under pressure being supplied to the inner end of cylinder 40 the piston rod 43 will be forced upwardly rocking the arm 17 in the opposite direction to swing the cut-off disc toward the work-holder means and to feed such disc through any work in the holder. The control of the supply of fluid under pressure to the cylinder 40 will be fully set forth when considering Fig. 11 wherein the piping arrangement for the entire machine is diagrammatically illustrated.

Figure 8:
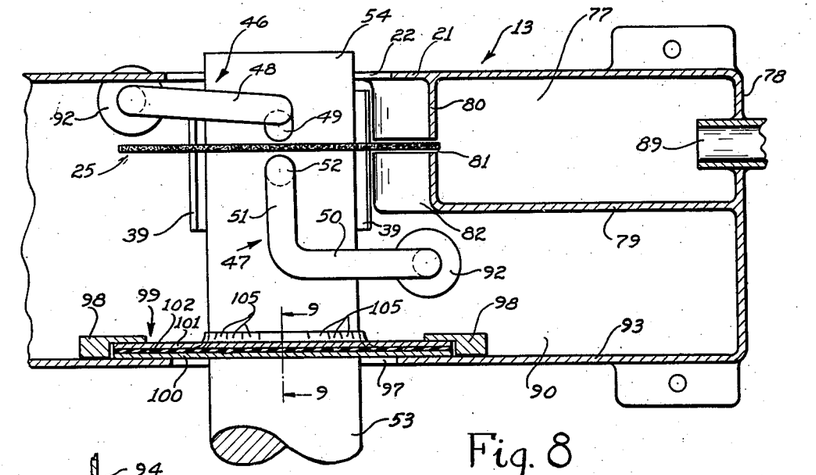
Fig. 8 is an enlarged horizontal sectional view through the cut-off housing, the view being taken substantially along the plane of the line 8—8 of Fig. 2.

The clamps associated with the V-block 39 are generally designated 46 and 47. Each clamp is in the form of a rod and clamp 46 extends upwardly into the housing 13 and therein includes a forwardly directed arm 48 having a depending work engaging portion 49. Clamp 47 likewise extends up into the housing 13 and therein includes a rearwardly directed portion 50 carrying a laterally extended portion 51 the free depending end 52 of which is designed to engage the work. During a cutting operation disc 25 passes between the work engaging portions 49 and 52 of the clamps as shown in Fig. 8. Such being the case the large piece of stock 53 is held rigid on the V-block as is the piece 54 being cut from the stock.

At their lower ends within the support 10 the clamps are screw threaded or otherwise adjustably connected with a crossbar 55 which in turn may be screw threaded or otherwise adjustably connected with the upper end portion of a piston rod 56 connected with a piston (not shown) within a cylinder 57. Means, later to be described, are provided for selectively applying fluid under pressure to the respective end portions of the cylinder 57. As such fluid is admitted to the lower end of the cylinder, the clamps 46 and 47 will be raised away from the V-block 39 and as the fluid is permitted to escape from the lower end portion of the cylinder and is admitted to the upper end portion thereof the clamps will be drawn down into engagement with the work and securely hold it in the V-block.

Means are provided whereby the cut-off disc is oscillated. This means so functions that as the hydraulic feed is operating to pass the disc through a piece of work, the disc is being bodily moved or oscillated back and forth in directions crosswise with respect to the work. At the back of the machine just above the base 11 is a trough 58 above which is located an electric motor 59, the base 60 of which is attached to the rear wall of the hollow support 10. On a shaft 61, driven by the motor 59, through reduction gearing (not shown) in the gear casing 59a, there is secured a small gear 62. Shaft 61 through a coupling 63 also drives the shaft 64 of a pump 65 arranged to supply fluid under pressure to the cylinders 40 and 57 as will later appear. Pump 65 is mounted on any suitable bracket 66 as shown.

A shaft 67 is mounted in bearings 68 and is located below and laterally of the motor 59. On shaft 67 is a relatively large gear 69 meshing with and driven by the gear 62. Gear 69 on its forward face carries a crank plate 70 having a slot 71 therein and along which a stud 72 is adjustable on manipulation of a screw 73. As the screw carries the stud it will be clear that on adjustment of the screw in one direction or the other the stud is adjusted to and from eccentric relation with the gear 69.

Pivotally mounted on the stud 72 is the lower end of a connecting rod or link 74 the upper end of which enters between a pair of spaced ears 75 rigid with the support 15 and the upper end of the link is pivotally connected to said ears as by means of a pin 76. With this construction it will be apparent that when the stud 72 is in eccentric relation to the gear 69, if such gear is being driven, the link 74 will transmit the eccentric motion of the stud to the support 15 with the result that the latter will be oscillated about the shaft 14.

Shaft 15 being substantially in vertical alignment with but spaced from the work-holder and the shaft 23, it will be clear that as the support 15 is oscillated the cut-off disc will be oscillated or moved back and forth in substantially a straight line. The movement of the support is imparted to the arm 17 as the latter is pivoted on the former by shaft 16 and the back and forth movement of the cut-off disc will be in the plane of its rotation but substantially at right angles to the movement it receives as the result of the rocking of the arm 17 about the shaft 16. If stud 72 is adjusted into concentric relation with the gear 69 there will be no oscillation of the disc and under other circumstances the length of the oscillating movement of the disc depends on the extent of adjustment of the stud by the screw 73.

Liquid coolant is supplied to the cut-off disc while it is in engagement with a piece of work. To this end a well 77 (see particularly Fig. 8) is formed within the housing 13 and is defined by a portion of the side wall 21 of the housing, a portion of the front wall 78 thereof, a side wall 79 and an inner wall 80, the latter having a vertical slot 81 therein for the passage of the cut-off disc. Also the lower portion 82 of the inner wall 80 is curved so as to extend inwardly to a point closely adjacent the V-block 39.

Within and toward one end of the support 10 is a liquid coolant reservoir 82' from which the coolant is taken by a pump 83 through a connection 94. A bracket 85 mounts the pump on the rear wall of support 10 and above the pump is located a motor 86 by which the pump is driven. From the pump a discharge connection 87 is carried through or around the machine to a pipe 88 which through a nipple 89 discharges into the well 77.

While in operation pump 83 maintains a circulation of the coolant and as the latter is spilled through the slot 81 in the front wall of the well (or is carried through said slot by the cut-off disc) it falls onto the wall 90 within the upper portion of the support 10 and then runs onto and passes through a removable perforated plate 91, returning to the reservoir 82'. If desired screens of suitable mesh may be provided beneath plate 91. Bushings 92 are located about the clamps 46 and 47 where they pass through the wall 90 so that all coolant falling onto wall 90 is returned to the reservoir and may not escape into the bed of the machine.

Housing 13 in the upper portion of its side wall 93 (this being the wall directly opposite wall 21) is provided with a large opening 93a normally closed by a door 94 hinged at 95 and secured in closed position by catches 96. In its lower portion wall 93 is provided with an opening 97 which while quite large is much smaller than the opening 93a. Opening 97 has its lower portion V-shaped as shown best in Fig. 2 and provides for the insertion of work into the V-block 39. When the cut-off disc is in an upper position opening 93a gives access thereto so that a worn disc may be replaced.

Guide rails 98 are secured to the inner surface of the lower portion of wall 93. The rails are located at opposite sides of the opening 97 and are vertically disposed with their upper ends terminating substantially flush with the lower edge of opening 93a. Screens generally designated 99 are received by the guide rails and each screen comprises an outer metal sheet 100, an inner metal sheet 101 and an intermediate rubber sheet 102. Plate 100 is provided with an opening 103 while plate 101 is provided with an opening 104 aligning with but of somewhat greater diameter than opening 103. The rubber sheet is provided with an opening smaller in diameter than opening 103 and about its opening the rubber sheet is radially slit to provide tongues or fingers 105.

A plurality of the screens 99 each having a different size of opening for the passage of work are supplied with each machine. When a certain size of work is to be cut—as, for example, the bar 53—a screen 99 having an opening of the proper size is placed in the guide rails. Then the work is inserted through the opening in the screen as shown in Fig. 8. As the opening in plate 101 is of slightly greater diameter than the opening in plate 100, the pushing of the work through the screen results in the fingers 105 of the rubber sheet 102 being forced inwardly in a manner to hug the work. Obviously the fingers being flexible and resilient different sizes of work, within limits, may be cut without changing of screens.

Figure 9:
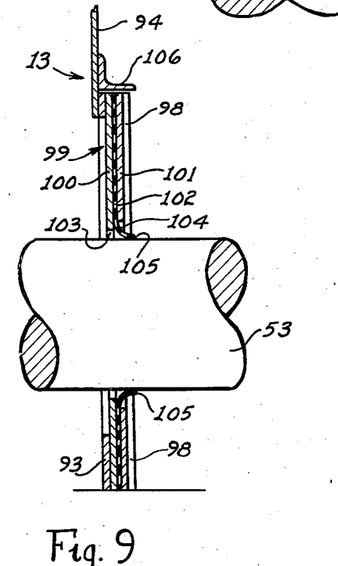
Fig. 9 is a detail sectional view taken substantially along the plane indicated by the line 9—9 of Fig. 8.
Figure 10:
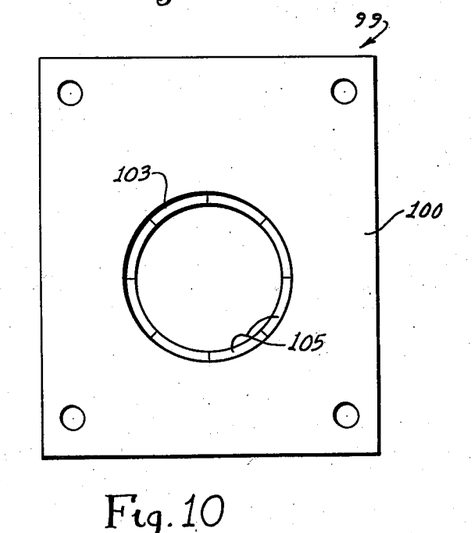
Fig. 10 is an elevational view showing a screen employed.

The liquid coolant is kept supplied to the well 77 in such quantity as to maintain the well substantially full in spite of the fact that the coolant is constantly gushing through the slot 81. Further the coolant is being thrown about in the housing 13 by the rapidly rotating disc 25. Screen 99 prevents the escape of the coolant through the opening 97 so that the coolant flows out through the slot 22 and below the lower end of the housing on the wall 92 returning to the reservoir 82'. The relation of the door 94 to the lower edge of the opening 93a is shown in Fig. 9. There it will be noted an angle member 106 on the lower part of the door overlies the upper edge of the lower portion of wall 93 providing additional means to prevent the escape of the coolant from the housing 13 except through the proper channels.

Motor 29 and parts adjacent thereto comprise considerable weight which must be moved by the motor 59 operating through the link 74 to cause oscillation of the cut-off disc. To partly compensate for this weight a heavy coil spring 107 is inserted into place bearing at one end against the base of the machine and at its other end against a plate 108 located at the lower side of the support 15. Obviously this spring functions as a counter-balance relieving the load on the motor 59.

Conveniently located at the front of the machine are switches 109, 110 and 111 controlling the circuits of the motors 29, 59 and 86 respectively. In the forward wall of the support 10 is a relatively large opening 112 normally closed by a plate 113 carrying a latch 114 for securing it in place. When this plate is removed access may be had to the piping leading to and from the cylinders 40 and 57, which piping is located within the hollow support 10 but is not shown in detail.

Pump 65 supplies fluid under pressure to a distributing valve generally designated 115 and mounted at the rear side of the machine as on a bracket 116. The valve includes a casing 117 and (referring now more particularly to Figs. 11 through 17) a valve member 118. Member 118 includes cut-outs or passages 119, 120 and 121. In the casing 117 and adapted to be controlled and at various times placed in communication by the cut-out 119 are ports 122, 123, 124 and 125. Other ports 126 and 127 are adapted to be placed in communication by the cut-out 120 and yet other ports 128, 129, 130, 131 and 132 are controlled by the cut-out 121.

Valve member 118 includes a stem 133 projecting through the inner end of the casing 117 and an opening 134 in the bracket 116 and at its free end connected with a shaft 135 extending to the forward side of the machine to be operated as hereinafter described. Obviously as valve member 118 is rotated by shaft 135 the ports of the various series in valve casing 117 are placed in communication with one another or cut-off from one another. The manner in which shaft 135 is operated as well as the means by which it is operated will later be fully described.

The pump 65 takes oil or other fluid from a sump 136 through a pipe 137 and discharges the fluid into a pipe 138 with which a pressure guage 139 is connected as by means of a tube 140. The guage is preferably located to be read from the front of the machine. Beyond the guage 139 pipe 138 connects with a port 124 of the valve casing 117.

At some point in the length of pipe 138 a pressure relief valve 141 is connected as by a pipe 142 and such relief valve is adapted to be adjusted from the front of the machine, being connected with a shaft 143 (see Fig. 2) to the forward end of which is attached a hand wheel 144. Valve 141 being adjusted to the desired pressure, it will by-pass into pipe 145 so that irrespective of the volume delivered by the pump 65 the pressure in the line 138 will remain substantially constant. This pressure is applied to the cylinder 40 for the purpose of raising and lowering the cut-off disc and for feeding the latter through the work.

A second relief valve designated 146 is utilized and the same is connected with the discharge from the valve 141 and in turn has a discharge or return tube 147 to the sump 136. A pipe 148, the pressure in which is controlled by the relief valve 146, connects pipe 145 with the port 127 of the distributing valve. If desired a pressure gauge 149 may be connected with pipe 148 to show the pressure therein and when used is preferably located adjacent the guage 139.

A pipe 150 connects port 125 with the lower end of cylinder 40 and intermediate its ends the pipe is connected by a pipe 151 with the port 129. Port 123 communicates with a pipe 152 connecting with the upper end of cylinder 40 through an adjustable valve 153 and one way valve 154. A pipe 155 communicates pipe 152 with port 132. A pipe 156 connects port 122 with a pipe 157 communicating at one end with the lower portion of cylinder 57 and at its other end with the port 131. Somewhat similarly, a pipe 158 connects port 126 with a pipe 159 communicating at one end with the upper end of cylinder 57 and at its other end with the port 128. A pipe 160 comprising a return to the sump 136 is connected with the port 130.

Figures 11, 12, 13, 14, 15:
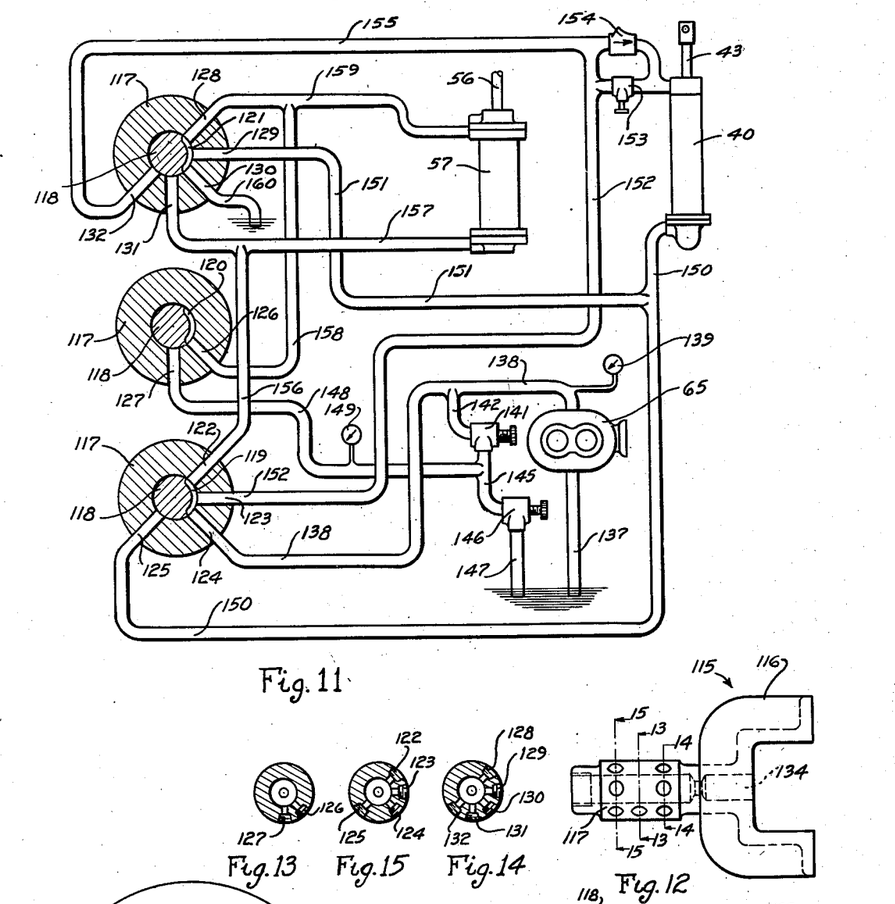
Fig. 11 is a diagrammatic view of the piping arrangement of the machine.
Fig. 12 is an elevational view of the casing of a distributing valve.
Fig. 13 is a transverse sectional view taken substantially along the line 13—13 of Fig. 12.
Fig. 14 is a similar view taken along the line 14—14 of Fig. 12.
Fig. 15 is a similar view taken as along the line 15—15 of Fig. 12.
Figure 16:
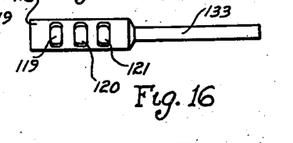
Fig. 16 is an elevational view of the valve member used in the casing of Fig. 12.

With the valve member 118 positioned as in Fig. 11 the cut-off disc 25 is in an upper position away from the work and the clamps 46 and 47 are likewise in upper positions releasing the work. This is true since the pipe 138 is delivering fluid under pressure to the pipe 152 through port 124, cut-out 119 and port 123 and such fluid under pressure passes freely through the one way valve 154 into the upper portion of the cylinder 40 to force the piston downwardly therein drawing downwardly on the rod 43 and rocking the arm 17 about the shaft 16 in a direction to elevate the cut-off disc 25 and maintain it away from the work-holder. The fluid cannot escape through the pipe 155 since the port 132 is closed.

Port 124 is also in communication with the port 122 so that fluid under pressure is supplied to the pipe 156 and thence through pipe 157 to the lower end of cylinder 57 forcing the piston therein upwardly raising the piston rod and thus the work clamps 46 and 47. The fluid cannot escape through the other end of the pipe 157 since the port 131 is closed. Fluid under pressure is not being supplied to the lower end of cylinder 40 since the port 125 is closed and is not being supplied to the upper end of cylinder 57 since port 127 is not in communication with port 126.

Now assuming that a piece of work is in the V-block the shaft 135 is operated so as to turn the valve member 118 the distance necessary to have cut-out 121 span ports 129, 130 and 131. This leaves ports 128 and 132 of the same series closed. It results in cut-out 120 placing ports 126 and 127 in communication and in cut-out 119 being shifted so that while ports 123 and 124 remain in communication, port 122 is cut off from communication with ports 123 and 124 while port 125 remains closed.

With member 118 in this advanced position port 125 being closed there will be no change in conditions insofar as cylinder 40 is concerned. However, fluid under the pressure determined by the setting of the relief valve 146 will be supplied to the port 126 and then through pipes 158 and 159 to the upper end of cylinder 57. This fluid under pressure cannot escape through port 128 since the latter is closed, but enters the upper end of cylinder 57 to work on the piston therein.

The fluid already in the lower portion of said cylinder may now escape through pipe 157, port 131, cut-out 121, port 130 to return pipe 160. It cannot escape through pipe 156 since port 122 is now closed. Thus shifting of the valve member as described results in operation of the piston rod 56 to bring the clamps 46 and 47 down onto the work that may be in the V-block 39. As long as member 118 remains in the described position the clamps will be holding the work and the cut-off disc will be held in an elevated position away from the work.

Since the work is being held the cut-off disc may be brought down to perform the cutting operation. Therefore valve member 118 is rotated one step farther. When this adjustment has been made cut-out 121 places ports 130, 131 and 132 in communication, cut-out 120 maintains ports 126 and 127 in communication and cut-out 119 places ports 124 and 125 in communication. Since ports 126 and 127 remain in communication and port 128 remains closed, while port 122 also remains closed and port 131 remains open, the clamps are held down against the work, the pressure being in the upper end of cylinder 57.

Port 124 now being in communication with port 125 fluid under pressure is supplied through pipe 150 to the lower end of cylinder 40. This pressure cannot escape through the pipe 151 as port 129 is now closed. Port 132 is open and in communication through port 130 with the return pipe 160. Therefore fluid may escape to the return pipe from the upper end of cylinder 40. However such escape is at a predetermined rate since valve 154 opens only to admit fluid to the upper end of the cylinder and valve 153 is adjusted to restrict the outflow of fluid from the upper end of the cylinder. As with the described adjustment of the valve member 118 port 123 is closed the fluid escaping from the upper end of cylinder 40 must pass through pipe 155 and thence through the return pipe 160.

Valve 153 restricting the escape of fluid from the upper end of cylinder 40 controls the rate at which the piston of said cylinder may move the rod 43 outwardly. Thus the rate of downward movement of the cut-off disc is controlled and may be regulated. It is desirable that the movement of said disc into initial contact with the work be at a slow rate of speed since if the disc is suddenly forced against the work it is likely that the disc will be broken as it is rotating at a high rate of speed. Under the same conditions if the disc did not break it would deflect out of its proper plane and start the cut in a place not in the true plane of the disc. This would result in the cut being made not at right angles to the axis of the material being cut and would produce cuts not parallel with one another.

With valve 153 properly adjusted there is resistance to the downward movement of the disc and the latter approaches and engages the work at about the same rate of speed as that at which it moves through the work. When the disc engages the work the resistance offered by the cutting operation is slightly greater than the resistance occasioned by restricting the escape of fluid through the valve 153 and thus ordinarily after the disc engages the work the rate of escape of fluid from the upper end of cylinder 40 becomes unimportant. However, under certain conditions as will later be set forth, the restriction of the rate of escape of fluid from the upper end portion of cylinder 40 continues to be of importance throughout the cutting operation.

After the disc has cut through the work, valve member 118 is rocked back one step in a counter-clockwise direction, closing ports 132 and 125, whereby pressure is no longer applied to the lower side of the piston of cylinder 40. This movement of the member 118 leaves ports 126 and 127 in communication so that pressure is maintained in the upper portion of cylinder 57 whereby the clamps 46 and 47 are held against the work.

The described shifting of member 118 again places port 123 in communication with port 124 so that fluid under pressure is again applied to the upper side of the piston of cylinder 40 causing piston rod 43 to be drawn inwardly of the cylinder and resulting in arm 17 being rocked about the shaft 16 in a direction to carry the disc upwardly away from the work. The next step in the counterclockwise movement of the valve member 118 places it in the position of Fig. 11 maintaining the cut-off disc elevated but opening the upper end of cylinder 57 to the return pipe 160 and supplying fluid under pressure to the lower end of such cylinder through pipes 156 and 157 whereby to raise the clamps to released positions.

Mounted in bearings 161 on the front of the machine is a shaft 162 to which is secured a short lever 163 projecting beneath and upon which rests the lower end of a vertically movable rod 164 having a button-like head 165. The arrangement is such that on said rod being depressed it rocks the lever 163 downwardly thereby imparting a rocking movement to the shaft 162. A coil spring 166 on the shaft is anchored at one end to a collar 167 also on the shaft and at its other end bears against a portion of the machine frame. The tendency of this spring is to turn the shaft 162 in a direction to raise the lever 163 and to return said shaft to a normal position when rocked therefrom as will later appear.

Rigid with shaft 162 and beneath and substantially in alignment with the forward end of shaft 135 is a latch member or lever 168. On the end of shaft 135, at the forward side of the machine, there is secured a block 169 having a handle or lever extension 170 adapted to be swung to rock said shaft and thereby turn the valve member 118 within the valve casing 117. Adjustable set screws 171 carried by a bracket 172 limit the movement of the block 169 and thus limit the turning movement of the shaft 135. Loose on said shaft at the forward side of the block 169 is a ring-like member 173 having a handle extension 174 normally held spaced from lever 170 by means of a coil spring 175.

At the forward side of the member 173 a plate 176 is disposed on shaft 135 and by means of a screw 177 said plate is connected with the block 169. Ring-like member 173 has an arcuate slot 178 through which the screw 177 extends whereby while the plate 176 must move with the block 169 and thus the lever 170, there may be relative movement between the member 173 and the shaft 135, plate 176 and block 169. In the edge of plate 176 there is a notch 179 and said edge is cut away to provide a shoulder 180 and a second notch 181. Member 173 is provided with a cam shoulder 182 corresponding with the notch 179, with a cam shoulder 183 corresponding with the shoulder 180 and with a cam shoulder 184 corresponding with the notch 181.

When the lever 170 is in the vertical position shown the distributing valve 115 and the other parts are in the positions shown in Fig. 11. On said lever being swung toward the left in Figs. 1 and 5 a distance sufficient to permit the latch member 168 to enter the notch 179 of plate 176 the valve member 118 is given such movement that while fluid under pressure is still being admitted to the lower end of cylinder 57 it is also being admitted to the upper end of such cylinder with the result that the work clamps are held in a neutral position. The object of this will later be set forth.

On lever 170 being moved a distance sufficient to permit the latch 168 to move up at the inner side of shoulder 180 the valve member 118 is brought to a position admitting fluid under pressure to the upper end of cylinder 57 and exhausting the fluid from the lower end of said cylinder whereby the clamps are brought down to engage the work. Thereafter lever 170 is swung an additional step in a counter-clockwise direction to a point where the latch 168 enters the notch 181. This positions the valve member 118 so that while fluid under pressure continues to be applied to keep the clamps against the work, it is also applied to the under side of the piston of cylinder 40 so as to bring the cut-off disc down and feed it through the work. It will be recalled that owing to the presence of the adjustable valve 153 the disc is not suddenly thrown against the work.

When desired, lever 174 is pressed in the direction of lever 170, compressing the spring 175, and such movement of the lever 174 results in a turning movement of the ring-like member 173 relative to the plate 176. Such being the case cam shoulder 184 engages the latch 168 and rocks it downwardly against the action of the spring 166 releasing said latch from the notch 181 of the plate 176 so that the plate and block 169 and lever 170 may start a return movement.

Such return movement will be imparted by the spring 185 just as soon as the latch is forced from the notch. The return movement is applied to the valve member 118 through the shaft 135 and this adjusts the distributing valve 115 so that the full pressure of the hydraulic medium is applied to the outer end of cylinder 40 resulting in the cut-off disc being raised from the work. Return movement of the disc may be and preferably is accomplished by the full hydraulic pressure so that such movement will be fast.

As a result of the described partial return movement of lever 170 the latch 168 is now against the shoulder 180 so that the clamps are being held down against the work. To release the clamps lever 174 is pressed toward lever 170 so that cam shoulder 183 presses the latch 168 downwardly beyond the free end of said shoulder 180 permitting spring 185 to again act to move lever 170 toward the vertical position whereby to return the distributing valve member 118 to the position of Fig. 11.

This results in the application of fluid under pressure to the lower side of the piston of cylinder 57 so as to raise the work clamps away from the work. Upward movement of the clamps away from the work may be limited by shifting lever 170 toward an advanced position to permit latch 168 to enter notch 179. When this is done fluid under pressure is admitted to both ends of cylinder 57 whereby the clamps are held in a neutral position just above the work. The idea here is that time will be saved if the clamps are stopped just above the work since on the next operation they will have but a short distance to travel to engage the work.

With this same idea of reducing the time interval between cuts, adjustable stop means is provided for limiting upward movement of the cut-off disc. Such means includes a stop lug 185a (see Fig. 2) secured to the support 15 and an adjustable stop screw 186 carried by the portion 20 of the arm 17. Obviously on the screw 186 engaging the lug 185a further downward swinging movement of the arm portion 20 about shaft 16 is positively prevented. This means that further upward swing movement of the arm portion 18 and the cut-off disc carried thereby is also positively prevented.

When a number of pieces of stock of the same or substantially the same diameter are to be cut the screw 186 is adjusted to engage the lug 185a immediately after the cut-off disc reaches a position slightly above the work to be cut. Therefore after one cut has been made, the direction of movement of the disc is reversed (due to manipulation of the valve 115 as will later be set forth) but the upward movement is checked by engagement of the stop screw with the stop lug. When the next piece is to be cut the disc moves downwardly but a very short distance before engaging the work and there is a considerable savings of time as the disc does not for each cut travel downwardly from the uppermost position to which it may be moved.

Figures 1, 5, 6:
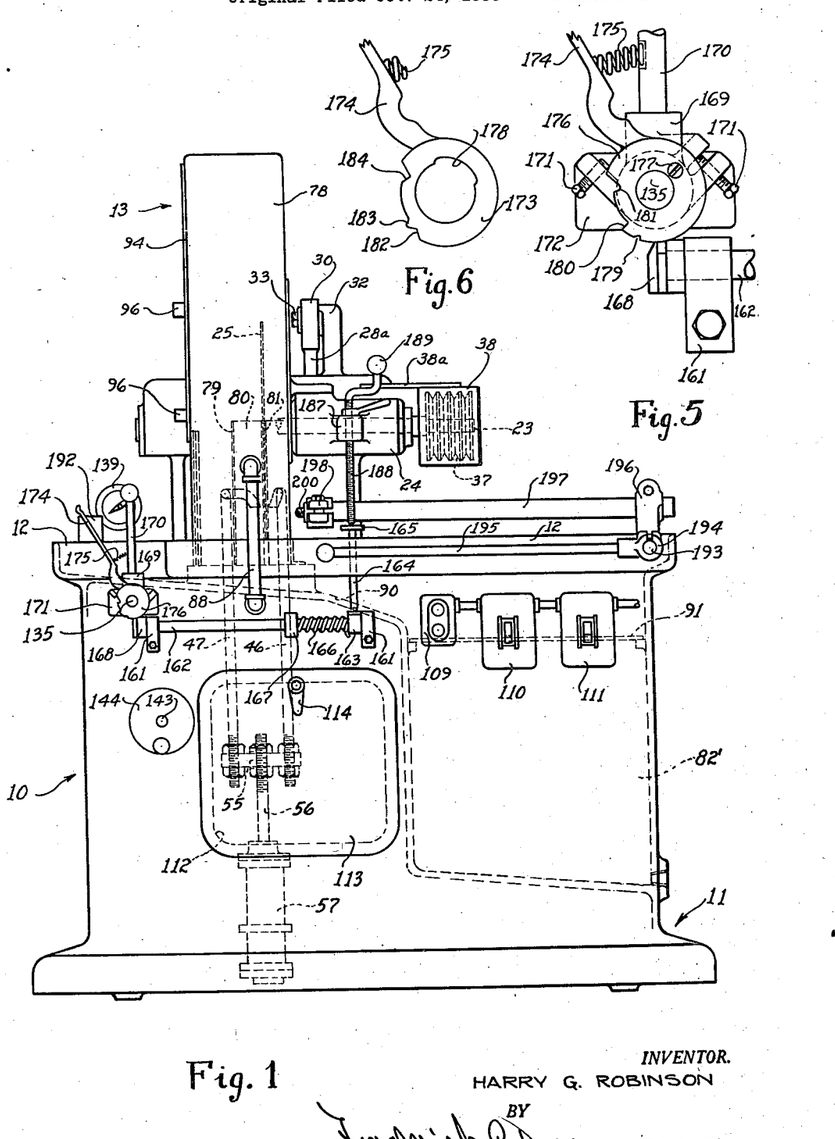
Fig. 1 is a front elevational view of a machine constructed in accordance with the invention.
Fig. 5 is an elevational view on an enlarged scale and showing a control employed.
Fig. 6 is a similar view showing a releasing lever of the control.
Figure 4:
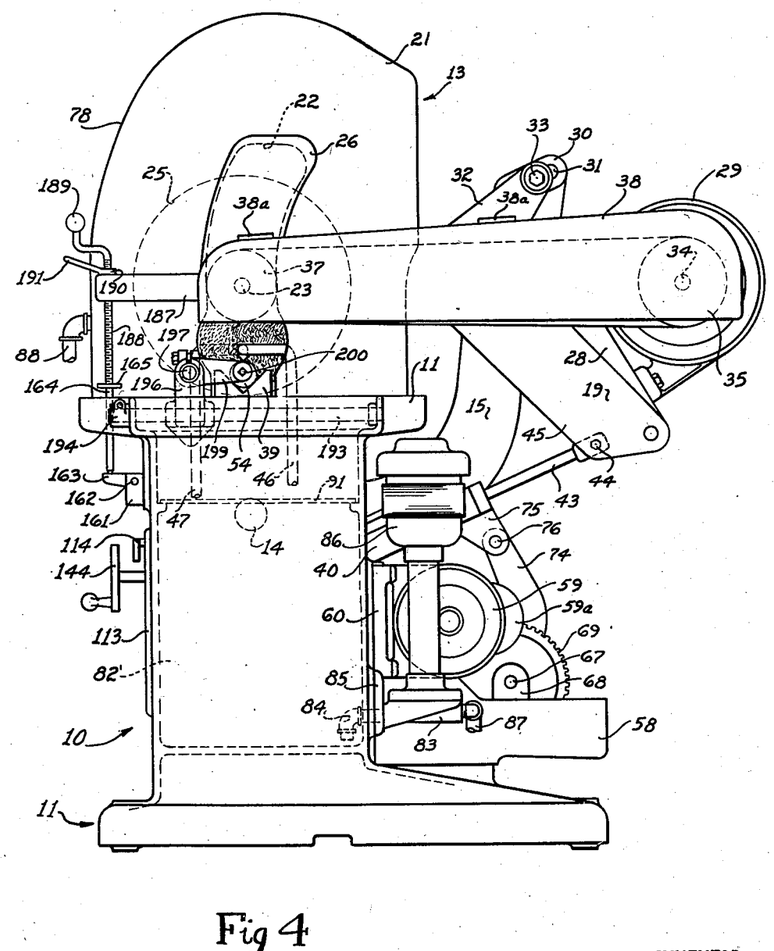
Fig. 4 is a side elevational view thereof, the view being taken looking from the right in Fig. 1.

The lower end of the vertically slidable rod 164 rests on the upper side of the short lever 163 and is normally held in the position of Figs. 1 and 4 owing to the tendency of the spring 166 to return shaft 162 to a position pressing latch 168 against disc 176. An extension 187 projects forwardly from the front end of arm portion 18 and adjustable through such extension is a screw 188. The screw may include a hand piece 189 for ease in turning the screw to adjust it and the screw is locked in adjusted position by a nut 190 having a handle-like extension 191.

Screw 188 is adjusted depending on the work to be cut and the adjustment is such that as the disc completes a cut the screw is carried into engagement with the head 165 of the vertically movable rod 164. Thereafter as the disc completes a cut the screw forces rod 164 downwardly whereby through lever 163 rod or shaft 162 is rocked in opposition to the spring 166. This carries latch 168 out of the notch 181 and the spring 185 then functions to rotate shaft 135 and thereby the valve member 118. Immediately this occurs the direction of movement of the cut-off disc is reversed and the latter is carried upwardly the distance permitted by adjustment of the top screw 186.

As the plate 176 is thus rotated with the shaft 135 its shoulder 180 is engaged by the latch 168 so that while the direction of movement of the cut-off disc is automatically reversed by the trip means described, the work clamps 46 and 47 continue to hold the work in the V-block. Thereafter lever 174 is manually operated to move latch 168 from engagement with shoulder 180 whereupon shaft 135 is further rotated by spring 185 to adjust the distributing valve and have the clamps moved up away from the work. At this time attention is directed to the fact that by manual return of lever 170 to its normal vertical position the hydraulic means of the machine may be reversed at will at any point in the cycle of operation of the machine.

Figures 3, 7:
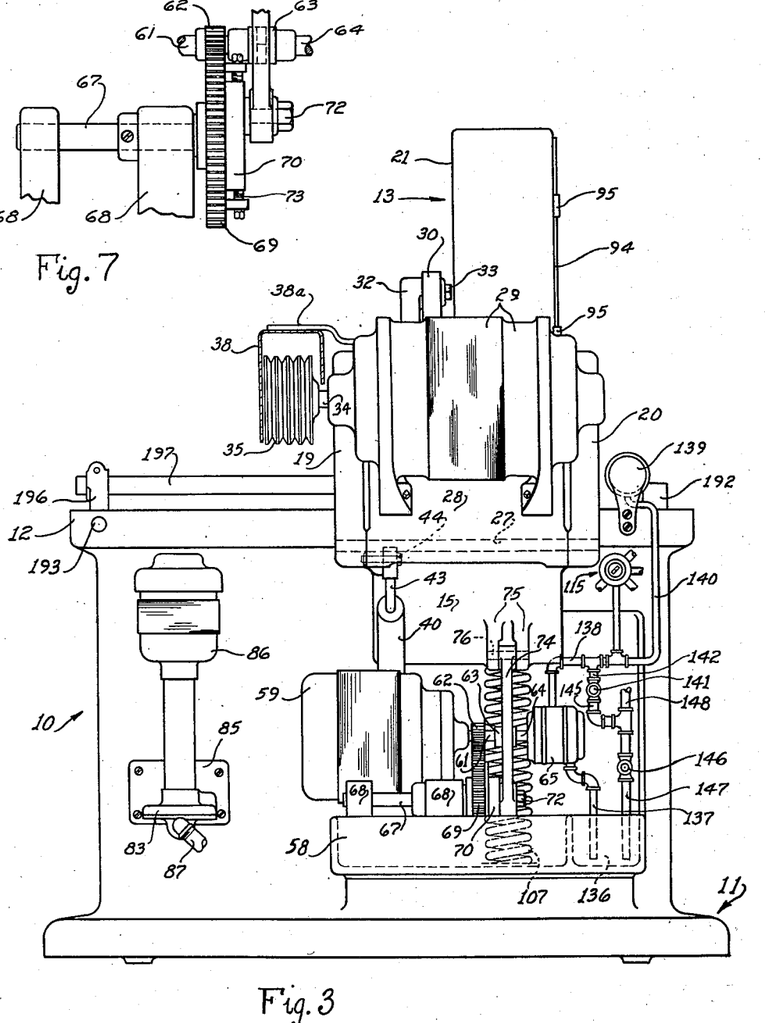
Fig. 3 is a rear elevational view of the machine.
Fig. 7 is an enlarged detail view showing a crank means employed.

An adjustable means is provided for assisting the operator when positioning work in the holder. Assuming that a piece of work is to be cut, as from a bar, the latter is inserted into the housing 13 through the screen 99 in such position that, within the housing, the bar is in the V-block 39 while an extending portion of the bar may rest on an outer V-block or support 192. The adjustable stop (see Figs. 1, 3 and 4) includes a shaft 193 mounted in suitable bearings and extending through the forward portion of the flange 12 at the upper edge of the machine frame.

By means of a pinchbind 194 a hand lever 195 is secured to the projecting end portion of shaft 193 whereby rocking of said lever will result in rotary movement of the shaft. On an intermediate portion of shaft 193 a double pinchbind 196 is secured and receives an end portion of a bar 197 extending forwardly in substantially parallel relation to the hand lever 195.

A pinchbind 198 on the forward end of bar 197 attaches to said bar a laterally extending arm 199 through the free end portion of which there is threaded a stop screw 200. Said screw is in alignment with any work in the V-block 39 so that as the operator pushes the bar, from which a piece is to be cut, through the V-block, the inner end of the bar will engage the forward end of the stop screw. Obviously with this arrangement the length of the piece cut from the bar by disc 25 will depend on or be determined by the adjustment of screw 200.

Assuming that a number of pieces of the same length are to be cut from a bar and that the screw 200 has been properly adjusted the following procedure may be advantageously employed. The operator pushes the bar forwardly until it engages the screw 200 and then manipulates lever 170 to cause clamping and cutting of the work. When a piece has been cut from the bar (as when the piece 54 has been cut from the bar 53) the cut-off disc is raised and the clamps are then raised. Then the operator swings the hand lever 195 upwardly raising the bar 197 and the screw 200. The severed piece may then fall from the V-block or be bushed therefrom by shoving the piece of stock 53 forwardly. Thereafter the operator lowers the lever 195 to bring the screw 200 back into alignment with the work and the latter is moved forwardly into engagement with the screw and thus positioned for the cutting off of a second piece. If the stop is not to be used the pinchbind 198 may be loosened and slipped back along the rod 197 so as to place the screw 200 in an out-of-the-way position.

When an exceptionally long piece is to be cut from a length of material the pinchbind 196 is loosened on the bar 197 and the latter is slipped outwardly to place its inner portion in said pinchbind whereupon the latter is tightened. Thereafter pinchbind 198 with arm 199 and screw 200 are mounted on the outer end of bar 197 in position to have the screw function as a stop for work projecting a considerable distance beyond the V-block. With this arrangement the stop is adjusted to have the machine cut off a piece of practically twice the length of the bar 197.

Figures 17, 20:
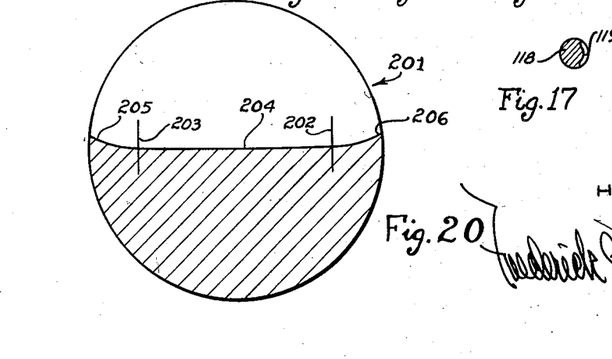
Fig. 17 is a sectional view taken as along the line 17—17 of Fig. 16.
Fig. 20 is a view suggesting the manner in which a cut is made according to the teachings of the present invention.

From the foregoing it will be understood that an important feature of the invention resides in the bodily back and forth movement of the cut-off disc in the plane of its rotation and while it is being fed through the work. With this arrangement the arc of contact between the disc and work is kept small and I am enabled to cut pieces of stock of large diameter with a relatively low power consumption. Further as the disc moves back and forth the coolant is admitted to all parts of the cut. Fig. 20 to some extent indicates a cut and there the stock 201 is shown as partly cut through. Excessive back and forth movement of the disc is to be avoided and may in any instance be for a distance less than the diameter of the piece being cut. In Fig. 20 the center of the disc is moved back and forth the distance between the indicator lines 202 and 203 and the intermediate portion 204 of the cut is substantially straight.

The surfaces 205 and 206 of the cut, such surfaces being the ends of the cut beyond portion 204, are concave since the surfaces 205 and 206 generally correspond with an arc of the same length along the periphery of the cut-off disc being used and thus depend on the diameter of the cut-off disc. The showing in Fig. 20 is exaggerated to suggest the type of cut rather than to illustrate a definite cut, the exaggeration being particularly as to the arcs at the ends of the cut and being (in the drawings) on a radius smaller than that of any cut-off disc that could be used for cutting the bar 201.

In any particular instance the back and forth movement of the disc is adjusted depending on the size of the work to be cut. Assuming that the maximum arc of contact between the disc and work is to be ½ of an inch the throw of the disc will be adjusted accordingly. The maximum contact between the disc and work takes place at the ends of the cutting stroke where a slight portion of the disc in the rear of the axis thereof is in engagement with the work although this engagement is of little importance in so far as the removal of material is concerned and may safely be ignored when computing the arc of contact.

Therefore if the axis of the disc is in a vertical line drawn ½ inch from the edge of the work the disc will engage the work for such distance forwardly of its axis and the engagement between the disc and work in the rear of the axis of the disc will be ignored. Thus if the maximum cutting arc is to be ½ an inch the back and forth movement of the disc will be the diameter of the work minus ½ inch at each end of the cutting stroke or a total back and forth movement of the diameter of the work minus one inch. With this arrangement or setting of the machine the arc of contact between the disc and work at each end of the cutting stroke will be the ½ inch maximum at the forward side of the axis of the disc and the slight contact at the rear of such axis being ignored.

It is to be understood that the figures given above as to arc of cutting engagement between the disc and work are purely by way of example and are not controlling. Further it will be clear that the configuration of the line at the bottom of the cut will vary according to the diameter of the disc being used and that the disc is subject to wear. The configuration of the mentioned line also depends on the length of stroke given the disc and such length of stroke is controlled by the setting of the screw 71.

Here it is noted that any length of stroke, even a very short stroke, is of advantage in making a cut since the arc of contact between the disc and work will be reduced. As the bottom of the cut between the curved end portions thereof is substantially straight the arc of contact between the disc and work for this portion of the cut is reduced over the maximum for which the machine may be set and thus it will be clear that at any given time there is but a small arc of contact between the disc and work, the maximum arc being at the ends of the cutting strokes.

The arc of contact being kept low it will be apparent that the resistance to the cutting action is never as great as it would be if a section of the periphery of the disc equal to the diameter of the stock was at any one time in engagement with the stock. Thus the back and forth movement of the disc relative to the work is particularly important when cutting stock of large diameter as the resistance to the rotation and downward feed of the disc is kept low.

Adjustment of valve 153 is important. This is true at the beginning and ending of a cut through a round piece of stock as at such times the back and forth movement of the disc is usually great enough to have the disc pass beyond the work. Under these or similar circumstances the fluid pressure on the feeding mechanism, if not resisted would force the disc downward to a position at the side of the work. That is, should the disc pass beyond one side of the work the resistance offered by the work would suddenly cease and the fluid under pressure acting to move the disc would give it a sudden downward movement. Should the disc move beyond the side of a piece of work it will be there but momentarily and cannot drop any appreciable distance due to the fact that downward movement thereof is being resisted according to the adjustment of the valve 153.

Should the disc drop or be forced down an appreciable distance at either side of the work, then at the start of its return movement the disc would jamb against the work attempting to make a deep cut therein. When cutting tubing the resistance offered by the setting of the valve 153 is important in that the disc during the times it is moving back and forth between the walls of the tubing is supported against any sudden downward movement.

Owing to the fact that the disc is hydraulically fed there is little or no variation in the pressure with which it is held against the work and there is little likelihood of the disc being broken by being jammed against a hard spot in the work as the relief valve of the system will take care of any excessive load. Also with the described feed the disc will be subjected to a constant wear and will give long life as compared with that obtained were the disc manually moved against and through the work. In such latter circumstances there is lacking the element of constant pressure and the operator is likely to force the disc trying to increase this production.

Figures 2, 18, 19:
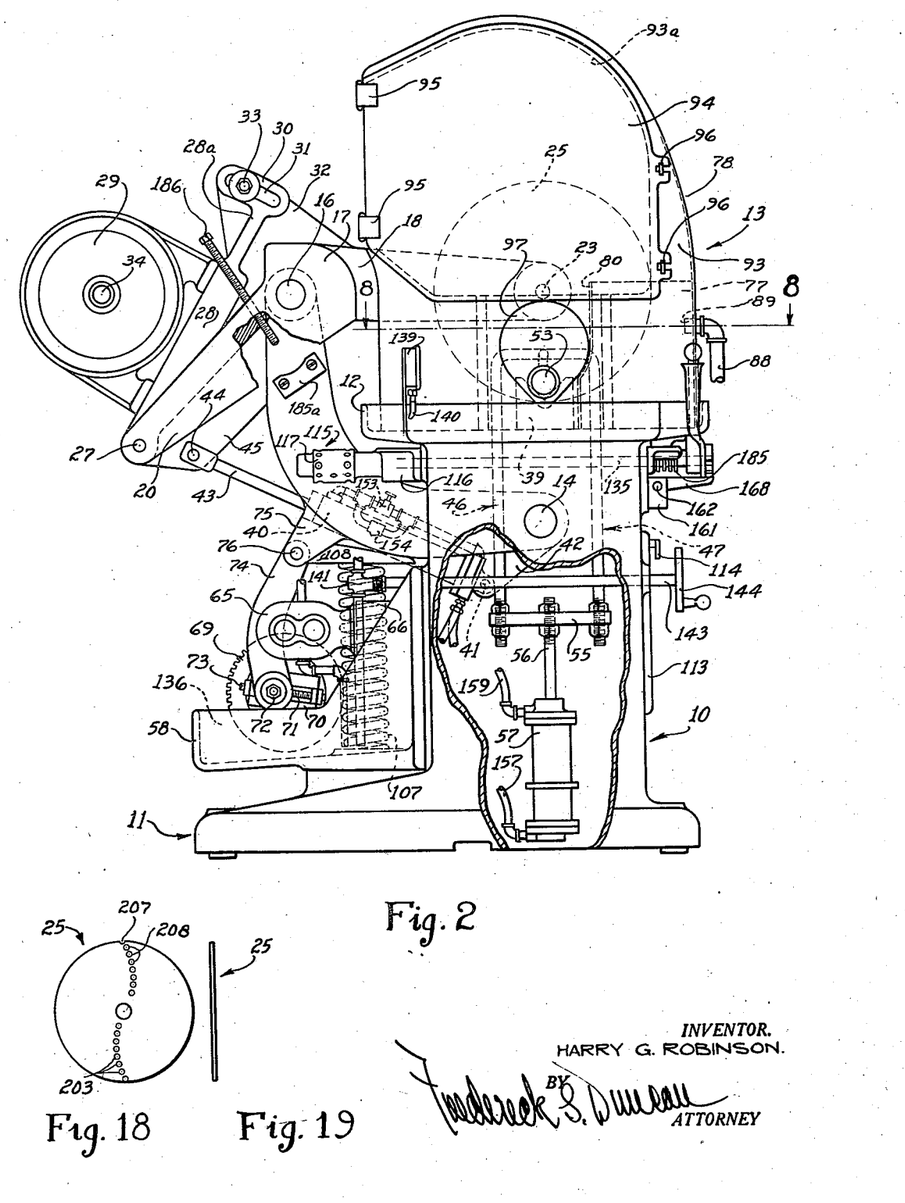
Fig. 2 is a side elevational view thereof, the machine being shown as viewed from the left in Fig. 1.
Fig. 18 is a face or side elevational view of the cutoff disc employed.
Fig. 19 is an edge view of such disc.

The disc 25 is of abrasive material and actually cuts through the work and may be of the construction disclosed in my Patent 2,047,649 of July 24, 1936. Referring to Figs. 18 and 19 the disc is quite thin being generally not over three-eighths inch in thickness and generally much less. Its periphery is notched as at 207 and it is also provided with openings 208. The openings at opposite sides of the center of the disc are arranged in staggered relation. Therefore as the disc wears down during use, a hole 208 first at one side and then at the other side of the center of the disc will break through providing a notch in the periphery of the disc. Preferably the holes are so related that before a first formed notch is completely obliterated a second hole has been broken through to form a new notch in the periphery of the disc.

As pointed out more fully in the patent above referred to the notches or recesses held the disc clear itself and together with the holes pick up coolant as the disc is rotated with its downwardly moving side in the well 77 and carry such coolant into a cut being made.

While the disc 25 is preferably of abrasive material whereby smooth clean cuts are obtained, for certain jobs and under certain conditions other types of discs may be used and I do not therefore limit myself to the use of abrasive discs except where they may be specified in the claims.

Having thus set forth the nature of my invention, what I claim is:

1. In a cut-off machine, a work-holder, a thin abrasive cut-off disc, means for rotating the disc, a pivotally mounted support, an arm pivotally mounted on said support, said disc mounted on said arm whereby as the arm is moved about its pivot the disc is swung toward and from the work-holder, and means continuously rocking said support on its pivot whereby as the disc is swung toward the work-holder it is continuously moved back and forth in the plane of its rotation but in directions substantially at right angles to the direction of its swinging movement.

2. In a cut-off machine, a work-holder, a thin abrasive cut-off disc, means for rotating the disc, a pivotally mounted support, an arm pivotally mounted on said support, said disc mounted on said arm whereby as the arm is moved about its pivot the disc is swung toward and from the work-holder, a driven means having connection with said support, and said means including a part adjustable to and from an eccentric position and adapted when in eccentric position to cause oscillation of the support and thereby movement of the cut-off disc back and forth across the work-holder.

3. In a cut-off machine, a work-holder, clamping means for securing work in said holder, a cut-off disc, means mounting the disc and work-holder for relative bodily movement to cut the work, hydraulic means operable to cause the clamping means to clamp the work, then to cause relative movement of the disc and work-holder to cut the work, then to cause relative movement of the disc and work-holder to separate the disc from the work and to thereafter operate said clamping means to release the work, adjustable means controlling the pressure used in providing the relative movement between the disc and work-holder, and other adjustable means controlling the pressure applied to said clamping means.

4. In a cut-off machine, a work-holder, clamping means for securing work in said holder, a cut-off disc, means mounting the disc and work-holder for relative bodily movement to cut the work, hydraulic means operable to control said clamping means and cause such relative bodily movement of the disc and work-holder, means controlling said hydraulic means whereby after the disc and work engage the clamping means cannot be released from the work until the disc and work are separated, adjustable means controlling the pressure used in providing relative movement between the disc and work-holder, and other adjustable means controlling the pressure applied to said clamping means.

5. In a cut-off machine, a housing, a work-holder in the housing, a cut-off disc in the housing, means to rotate said disc, said housing having a relatively large opening in a side wall for the insertion of work to the holder, means for moving said disc toward and from work in the holder, means for supplying the disc with a liquid coolant, guide ways on said housing wall adjacent said opening, a screen in and removable from said guide ways, said screen including a portion having a smaller opening aligning with a portion of the opening in the housing wall, and said screen portion of flexible material to engage work inserted into the housing and prevent the escape of said liquid coolant through such opening in the housing wall.

6. In a cut-off machine, a work-holder, a cut-off disc, clamps for securing work in the holder, means for rotating the disc, means mounting the disc for movement toward and from the work-holder, hydraulic means for actuating said clamps and for moving the disc toward and from the work-holder, a manual control for starting said hydraulic means into operation, means whereby on actuation of said hydraulic means said clamps are actuated to clamping positions and then the disc is moved to and through the work, trip means for partly reversing the hydraulic means when the disc has passed through the work to reverse movement of the disc and carry it out of the work, and said manual means then operable to complete the reversing of the hydraulic means to move the clamps away from the work.

7. The combination as in claim 6 wherein said manual control is operable at will during any part of the machine's operation to partly and completely reverse said hydraulic means.

8. In a cutting machine, a thin abrasive cut-off disc, means for rotating the disc, means mounting the disc for movement to carry it through a piece to be cut, hydraulic means for effecting such movement of the disc and including a cylinder and piston construction of which one is anchored and the other is connected with said mounting means, means for supplying fluid to opposite sides of the piston for moving the disc toward and from the work, and means restricting the flow of fluid from one side of the piston while fluid is being supplied to the other side thereof to move the disc toward the work whereby movement of the disc toward the work is resisted but in a lesser degree than that occasioned by movement of the disc through the work in an actual cutting operation.

9. In a cutting machine, a cutting disc, means for rotating the disc, means mounting the disc for movement to carry it through a piece to be cut, hydraulic means for effecting such movement of the disc and including a cylinder and piston construction of which one is anchored and the other connected with said mounting means, means for supplying fluid to opposite sides of the piston for moving the disc toward and from the work, means for imparting a back and forth bodily movement to the disc in directions substantially at right angles to the directions of movements toward and from the work, and means restricting the flow of fluid from one side of the piston while the fluid is being supplied to the other side thereof to move the disc in the direction of the work whereby such movement of the disc outside the work is resisted but in a lesser degree than that occasioned by the actual cutting operation.

10. In a cutting machine, a housing, a workholder in the housing, a cutting disc in the housing, means to rotate the disc, said housing having a relatively large opening in a side wall for the insertion of work to the holder, means operable to move the disc toward and from work in the holder, means for supplying liquid coolant to the disc, a removable screen over said opening, said screen including a portion having a smaller opening aligning with a portion of the opening in the housing wall, and said screen portion of flexible material to engage work inserted into the housing and prevent the escape of said coolant through the opening in the housing wall.

11. In a cutting machine, a housing, a workholder in the housing, a cutting disc in the housing, means to rotate the disc, said housing having a relatively large opening in a side wall for the insertion of work to the holder, means operable to move the disc toward and from work in the holder, means for supplying liquid coolant to the disc, a removable screen over said housing, said screen comprising a laminated structure including a pair of sheets having a smaller opening aligning with a portion of the opening in the housing wall, and one of said sheets of flexible material to engage work inserted into the housing and prevent the escape of said coolant through such opening in the housing wall.

HARRY G. ROBINSON.